(12) United States Patent
Lin

(10) Patent No.: US 10,602,581 B2
(45) Date of Patent: Mar. 24, 2020

(54) LIGHTING SYSTEM

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 0 days.

(21) Appl. No.: 16/409,040

(22) Filed: May 10, 2019

(65) Prior Publication Data

US 2019/0357330 A1    Nov. 21, 2019

(30) Foreign Application Priority Data

May 15, 2018    (CN) .......................... 2018 1 0461140

(51) Int. Cl.
*H05B 33/08* (2020.01)
*H05B 37/02* (2006.01)

(52) U.S. Cl.
CPC ..... *H05B 33/0857* (2013.01); *H05B 37/0272* (2013.01); *H05B 37/0281* (2013.01)

(58) Field of Classification Search
CPC ............ H05B 33/0803; H05B 37/0227; H05B 37/0272; H05B 33/0872; H05B 37/0281; H05B 33/0857; H05B 33/0854; H05B 37/0218; H05B 33/0815; H05B 33/0845; H05B 33/0887; H05B 33/0884; H05B 39/086; H05B 39/088; H05B 33/08; H05B 33/0827; H05B 33/0866; G06F 3/015
See application file for complete search history.

(56) References Cited

U.S. PATENT DOCUMENTS 10,054,271 B2 *    8/2018    Xiong .................... F21V 3/061

* cited by examiner

*Primary Examiner* — Monica C King
(74) *Attorney, Agent, or Firm* — Birch, Stewart, Kolasch & Birch, LLP

(57) ABSTRACT

A lighting system includes a controlling device and a lighting device. The controlling device is configured to receive an electrical signal from mains electricity, enter a transition mode upon receiving a tuning signal, and enter a normal mode after a predetermined period of time has elapsed since a latest receipt of the tuning signal. The controlling device is further configured, in the normal mode, to continuously output the electrical signal as a control signal to the lighting device, and in the transition mode, continuously output a modified signal as the control signal to the lighting device.

9 Claims, 5 Drawing Sheets

LIGHTING SYSTEM

CROSS-REFERENCE TO RELATED APPLICATION

This application claims priority of Chinese Invention Patent Application No. 201810461140.7, filed on May 15, 2018.

FIELD

The disclosure relates to a lighting system, and more particularly to a lighting system which is capable of controlling color temperature of light emitted from the lighting system.

BACKGROUND

A conventional light-emitting diode (LED) system of which color temperature of emitted light is controllable includes an LED module, and a controller coupled to the LED module to control the color temperature of light emitted by the LED module. The controller is provided with a button. A user may cyclically change the color temperature of light emitted by the LED module by repeatedly pressing the button in order for the LED module to emit light with an intended color temperature based on the number of times the button is pressed. In this situation, each time the button is pressed, the color temperature changes accordingly. However, the color-temperature variations that occur before the intended color temperature is reached may be quite bothersome or uncomfortable to the user.

SUMMARY

Therefore, an object of the disclosure is to provide a lighting system that can alleviate at least one of the drawbacks of the prior art.

According to the disclosure, the lighting system includes a controlling device, and a lighting device connected to the controlling device. The controlling device is configured to receive an electrical signal from mains electricity, operate in one of a normal mode and a transition mode, enter the transition mode upon receiving a tuning signal, and enter the normal mode after a predetermined period of time has elapsed since a latest receipt of the tuning signal. The lighting device includes a plurality of light-emitting diodes (LEDs), and is configured to receive a control signal from the controlling device, and to set a color temperature of light emitted by the LEDs according to waveform of the control signal. The controlling device is further configured, in the normal mode, to continuously output the electrical signal as the control signal, and in the transition mode, to generate a modified signal by modifying the electrical signal according to the tuning signal and to continuously output the modified signal as the control signal.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
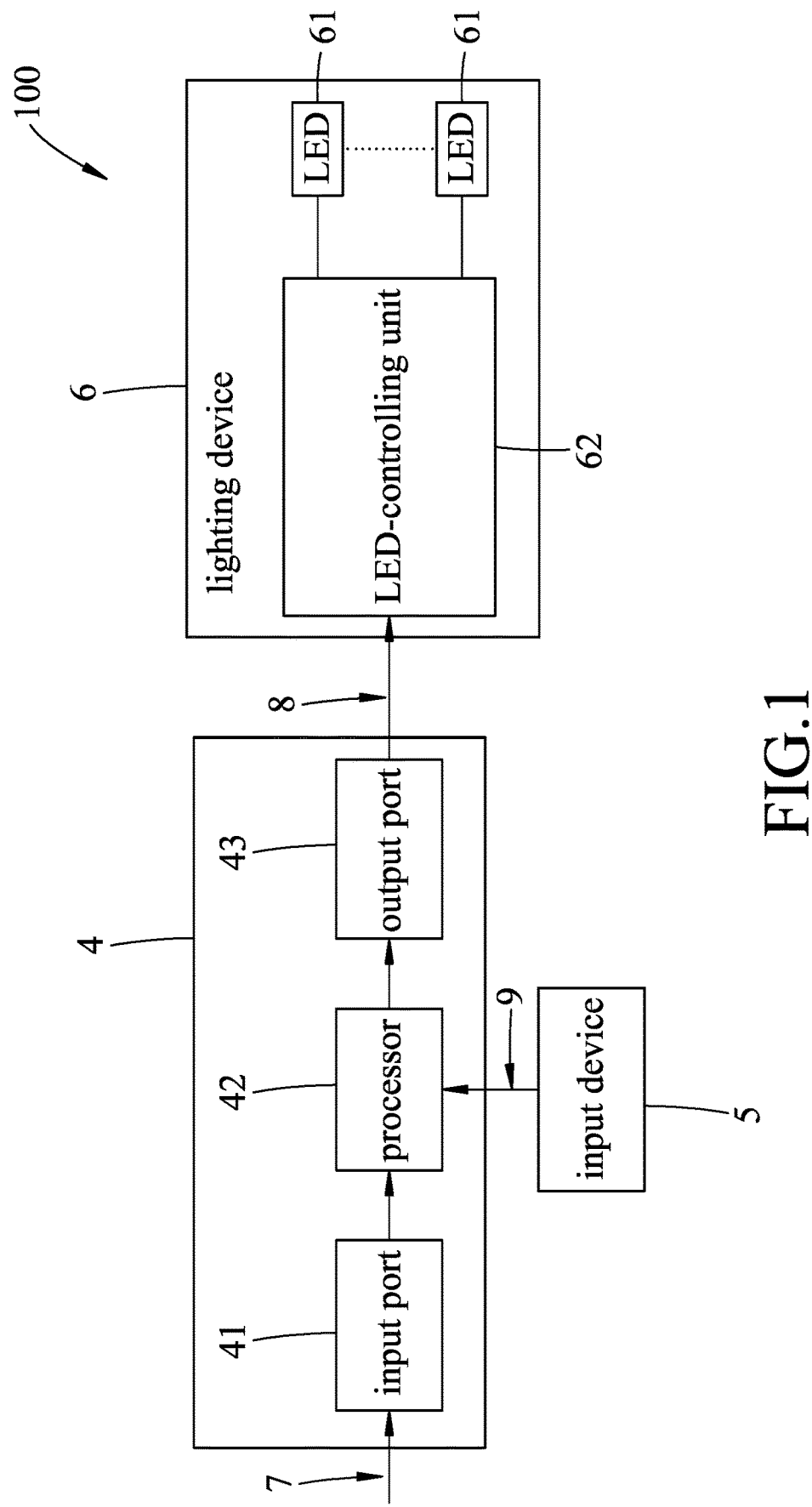
FIG. 1 is a block diagram exemplarily illustrating a lighting system according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a lighting system 100 according to an embodiment of this disclosure is illustrated. The lighting system 100 includes a controlling device 4, an input device 5 in communication with the controlling device 4, and a lighting device 6 connected to the controlling device 4.

The controlling device 4 is configured to have two operation modes, namely, a normal mode and a transition mode (details will be described below), and includes an input port 41, an output port 43, and a processor 42 electrically connected with the input port 41 and the output port 43. The controlling device 4 is configured to receive through the input port 41 an electrical signal 7, which may be an alternating current (AC) signal, from mains electricity, and to output through the output port 43 a control signal 8 to the lighting device 6. The controlling device 4 is also configured to receive a tuning signal 9 from the input device 5.

The lighting device 6 includes a plurality of light-emitting diodes (LEDs) 61 and an LED-controlling unit 62 electrically connected to each of the LEDs 61. The LED-controlling unit 62 includes a memory (not shown), and may be, for example, a microcontroller unit (MCU). The lighting device 6 is configured to receive the control signal 8 from the controlling device 4, and to set a color temperature of light emitted by the LEDs 61 according to waveform of the control signal 8.

The input device 5 is configured to generate the tuning signal 9 in response to user operation on the input device 5, and to send the tuning signal 9 to the controlling device 4 through wired or wireless communication, e.g., via a wire connected between the input device 5 and the controlling device 4, via radio frequency (RF) communication, or via Infrared (IR) communication. The input device 5 includes an interaction device (not shown) allowing a user to operate to select a desired color temperature of light emitted by the LEDs 61, and is configured to generate and send the tuning signal 9 corresponding to the user selection of the desired color temperature. According to some embodiments, the interaction device may be a button, a knob, a touch screen or plural buttons, and the tuning signal 9 generated and sent by the input device 5 may be of plural types indicating plural different color temperatures, respectively. In an embodiment, the tuning signal 9 can be of three types respectively indicating three different color temperatures (e.g., 3000K, 4000K and 5000K), and respectively being RF signals of a same frequency band (e.g., 304 MHz) but with different coded contents. Detailed operations of the abovementioned elements of the lighting system 100 will be described below with reference to FIG. 2 which exemplarily illustrates an operation method 200 of the lighting system 100 for setting a color temperature of light emitted by the LEDs 61.

In step 201, the controlling device 4 operates in a normal mode, in which the controlling device 4 continuously receives electrical signal 7 from mains electricity, and continuously outputs the electrical signal 7 as the control signal 8 to the lighting device 6. The control signal 8 transmitted from the controlling device 4 in the normal mode (i.e., the electrical signal 7) to the lighting device 6 drives the LED-controlling unit 62 of the lighting device 6 to trigger the LEDs 61 to emit light with their former color temperatures. That is, the control signal 8 identical to the electrical signal 7 (may be referred to as "normal control signal 8" hereinafter) does not change the overall color temperature of light emitted by the LEDs 61. For example, the overall color temperature of the LEDs 61 may be set at an initial color temperature (e.g., a color temperature of 3000K) when the lighting device 6 is switched on, and if the lighting device 6 keeps receiving the normal control signal 8 after being switched on, the LEDs 61 of the lighting device 6 would keep emitting light having the initial color temperature.

Figure 3:
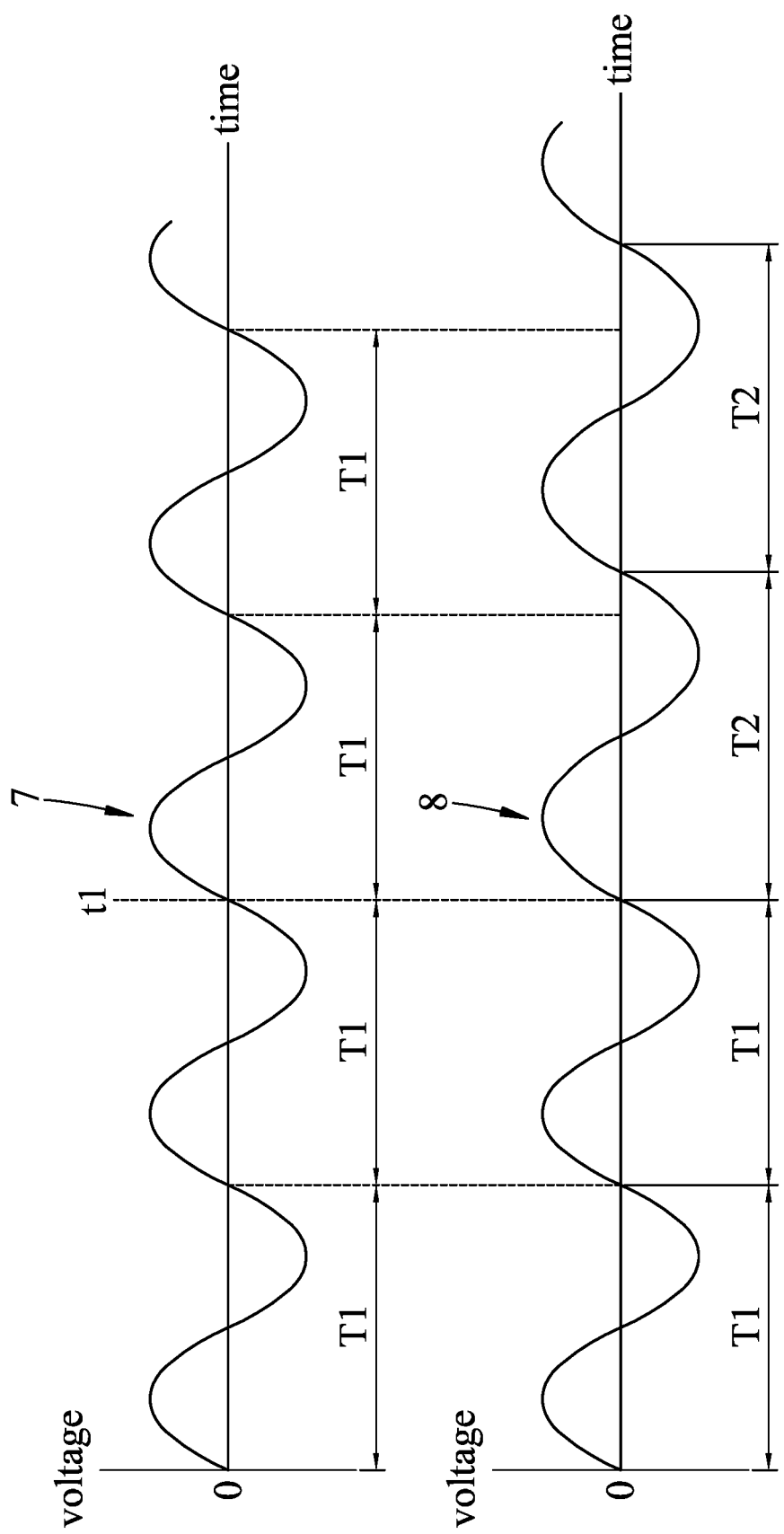
FIG. 3 schematically illustrates a first signal modification according to an embodiment of this disclosure.
Figure 4:
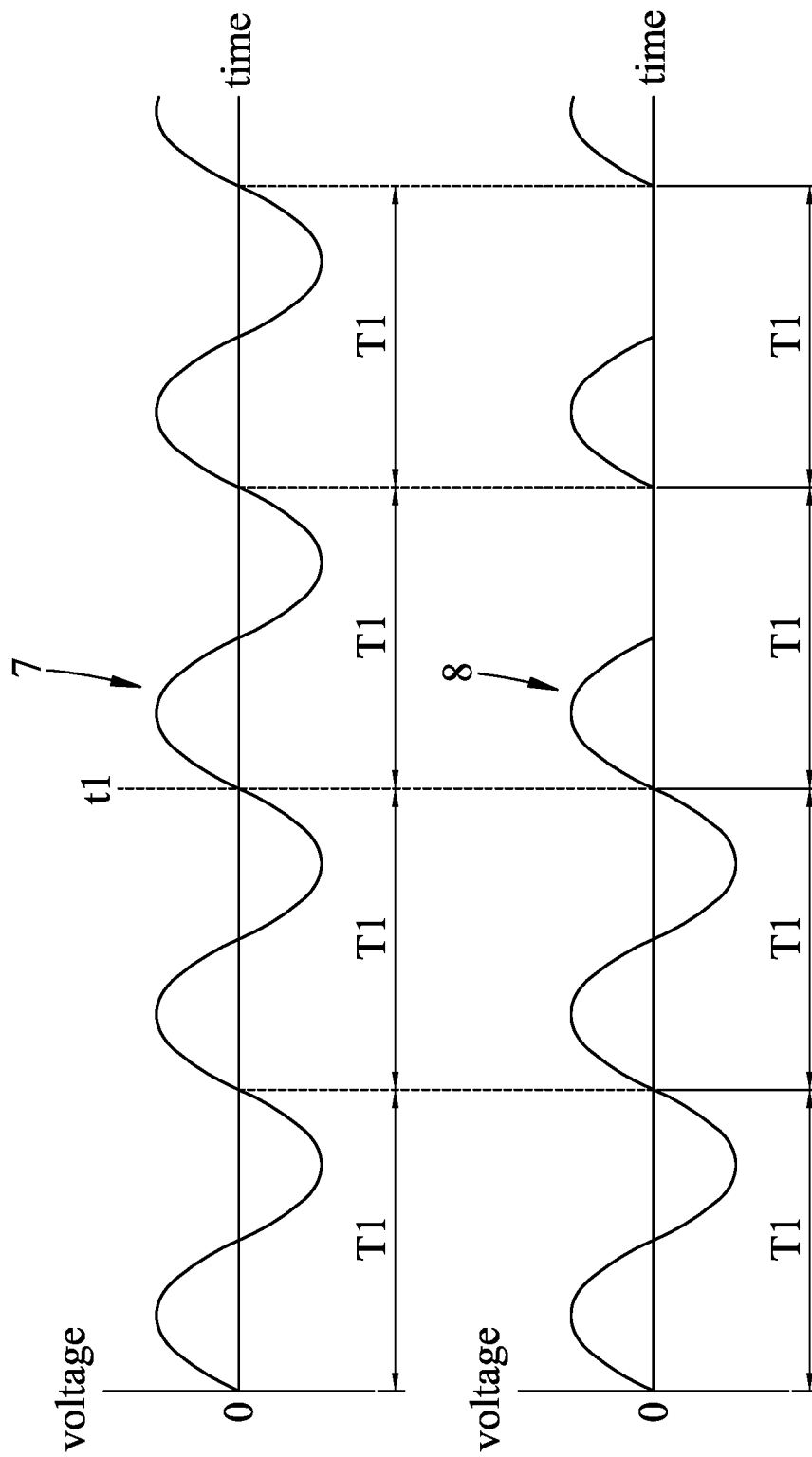
FIG. 4 schematically illustrates a second signal modification according to an embodiment of this disclosure.
Figure 5:
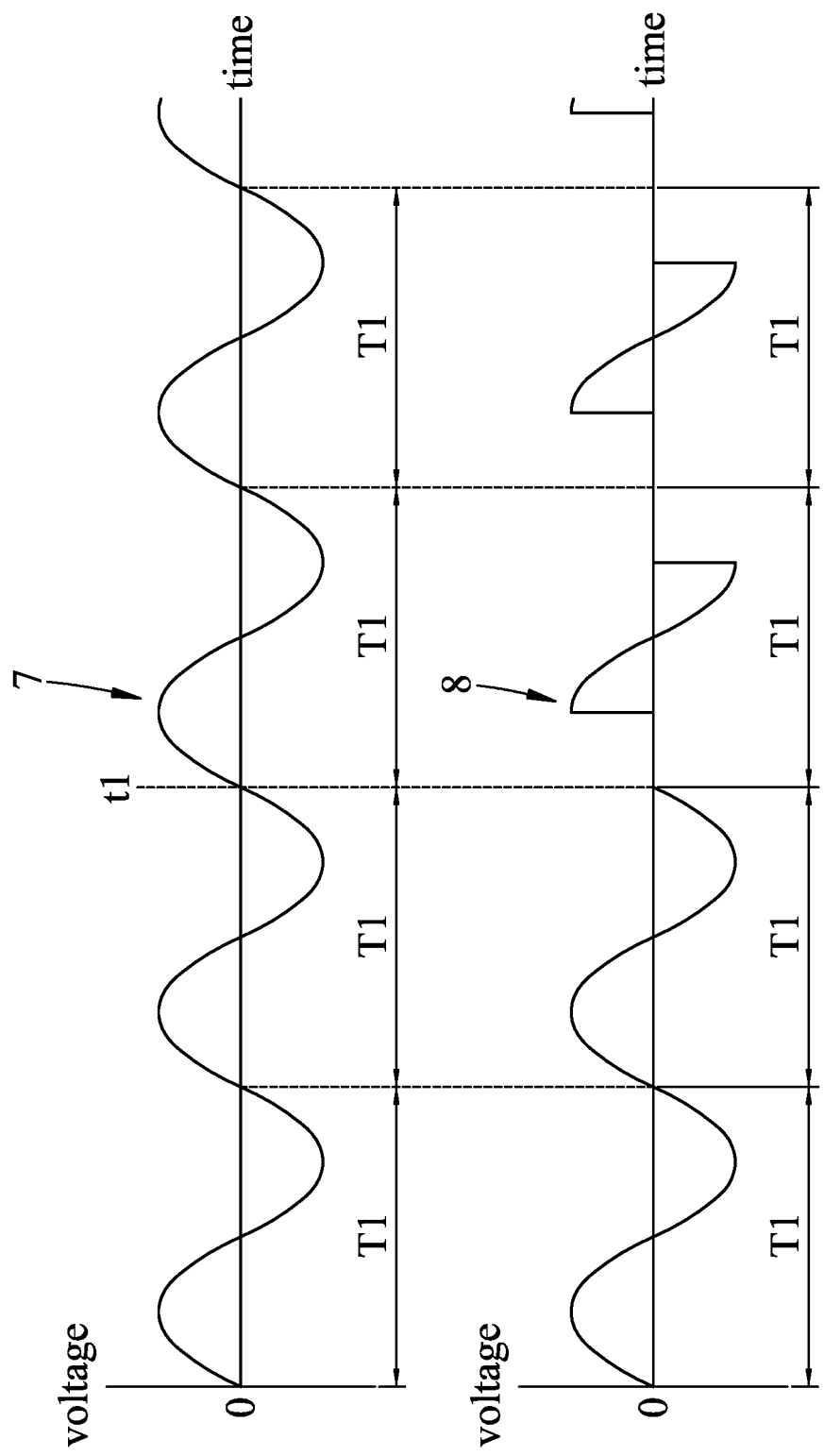
FIG. 5 schematically illustrates a third signal modification according to an embodiment of this disclosure.

In step 202, when the controlling device 4 receives the tuning signal 9 from the input device 5, the controlling device 4 enters the transition mode. In the transition mode, the processor 42 of the controlling device 4 generates a modified signal by modifying the electrical signal 7 according to the received tuning signal 9, and continuously outputs the modified signal as the control signal 8 (may be referred to as "transition control signal 8" hereinafter). FIGS. 3-5 respectively illustrate three different ways to modify the electrical signal 7 into the modified control signal 8. FIGS. 3-5 all illustrate a same situation that the controlling device 4 receives the tuning signal 9 at a time point (t1), before which the controlling device 4 operates in the normal mode and after which the controlling device 4 operates in the transition mode. The electrical signal 7 and the control signal 8 can be voltage signals or current signals. However, FIGS. 3-5 are illustrated with both of the electrical signal 7 and the control signal 8 being voltage signals.

Referring to FIG. 3, in an embodiment, the modified control signal 8 is generated by altering the period length (and hence the frequency) of the electrical signal 7 so as to generate the modified control signal 8 to have frequency different from that of the electrical signal 7. It can be seen from FIG. 3 that the period length (T2) of the modified control signal 8 is greater than the period length (T1) of the electrical signal 7 and the normal control signal 8. That is, the modified control signal 8 has a lower frequency than the electrical signal 7. In some embodiments, the frequency of the electrical signal 7 may be 50 Hz or 60 Hz, or other values depending on the city or country in which the lighting system 100 is located. According to some embodiments, the frequency of the modified control signal 8 may be lower than the frequency of the electrical signal 7 by a small range (e.g., 2-10 Hz), wherein distinct types of received tuning signals 9 would cause distinct frequency differences.

In the embodiments illustrated in FIGS. 4 and 5, the modified control signal 8 is generated by making waveform of at least a portion of the modified control signal 8 different from that of the electrical signal 7, while maintaining the frequency of the electrical signal 7 so that the frequency of the modified control signal is the same as that of the electrical signal 7. For example, in the embodiment illustrated in FIG. 4, the modified control signal 8 is generated by making a tail portion (e.g., second half) of each periodic wave (e.g., one full cycle of a sine wave in the depicted examples) of the modified control signal 8 zero in amplitude, wherein a distinct type of the received tuning signal 9 would cause a distinct length (or ratio) of the zero-amplitude tail portion. As another example, in the embodiment illustrated in FIG. 5, the modified control signal 8 is generated by making both of a head portion and a tail portion of each periodic wave of the modified control signal 8 (e.g., the first and fourth quarters of each periodic wave of the control signal 8) zero in amplitude, wherein a distinct type of the received tuning signal 9 would cause a distinct length (or ratio) of the zero-amplitude head and tail portions.

Turning back to FIG. 2, in step 203, the LED-controlling unit 62 of the lighting device 6 detects a change in the waveform of the control signal (from an original waveform to a changed waveform), and starts a timer upon detection of the change. The timer would expire after a predetermined period of time has been timed, wherein the predetermined period of time is relatively short and may fall within a range of 1-5 seconds according to some embodiments. In an embodiment, the LED-controlling unit 62 detects the change by storing the waveform of each received control signal 8 in the memory thereof, and comparing the waveform of the control signal 8 received in the current period with the waveform of the control signal 8 received in a last period. It should be noted that the detected change in the waveform may be from the waveform of the normal control signal 8 (i.e., the waveform of the electrical signal 7) to a waveform of a modified control signal 8, or from a waveform of a first modified control signal 8 to a waveform of a second modified control signal 8 that is different from the first modified control signal 8 in, for example, frequency or zero-amplitude ratio. In the latter case, the timer would have been started and would be timing when the change (from the first modified control signal to the second modified control) is detected, and the LED-controlling unit 62 would restart the timer upon detection of the change. In an embodiment, the memory of the LED-controlling unit 62 stores plural predetermined waveforms that are different from the waveform of the electrical signal 7 and that correspond respectively to different color temperature settings, and the timer would be started/restarted only when the LED-controlling unit 62 determines that the changed waveform matches one of the predetermined waveforms stored in the memory.

In step 204, after the predetermined period of time has elapsed since a latest receipt of the tuning signal 9 from the input device 5, the controlling device 4 enters the normal mode in which the controlling device 4 continuously outputs the electrical signal 7 received from mains electricity as the control signal 8 to the lighting device 6. The determination of whether the predetermined period of time has elapsed may be performed by using another timer disposed in the controlling device 4.

In step 205, when the timer expires, the LED-controlling unit 62 of the lighting device 6 triggers at least a portion of the LEDs 61 to emit light with a color temperature according to the changed waveform (i.e., the waveform of the control signal 8 in the current period). Specifically, the LED-controlling unit 62 may trigger at least a portion of the LEDs 61 to emit light according to a color temperature setting stored in the memory of the LED-controlling unit 62 that corresponds to the changed waveform.

In some embodiments, the LED-controlling unit 62 determines whether the changed waveform matches anyone of the predetermined waveforms stored in the memory. Only when it is determined that the changed waveform matches one of the predetermined waveforms stored in the memory will the LED-controlling unit 62 trigger the LEDs 61 to emit light according to the color temperature setting corresponding to the one of the predetermined waveforms.

According to some embodiments, the LED-controlling unit 62 may trigger the at least a portion of the LEDs 61 to emit light with more than one color temperature. For example, the LED-controlling unit 62 may trigger plural subsets of the LEDs 61 to emit light with plural color temperatures, respectively.

Figure 2:
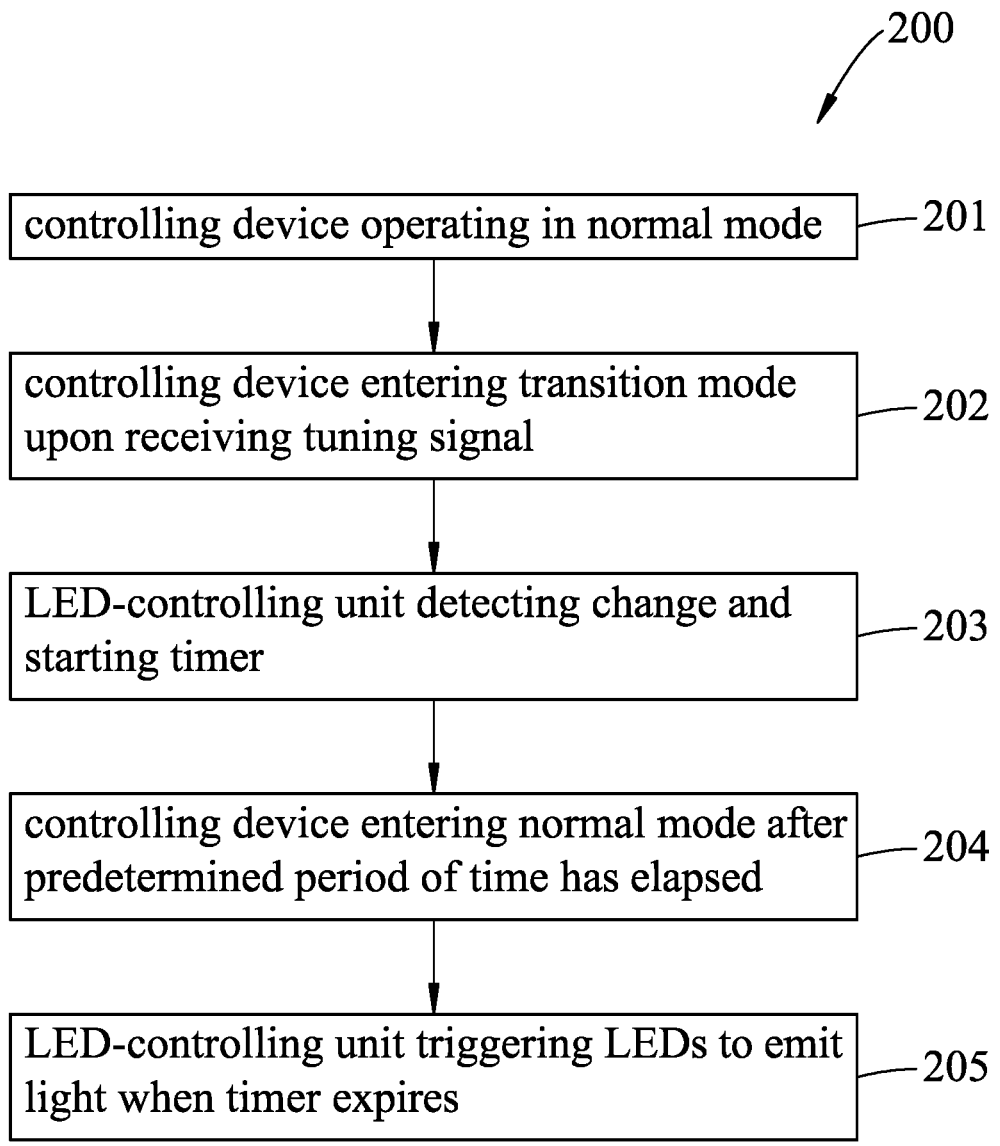
FIG. 2 is a flow chart exemplarily illustrating a method for controlling a color temperature of light emitted by light-emitting diodes (LEDs) according to an embodiment of this disclosure.

It should be noted that the flow in FIG. 2 is for illustrative purpose only, and there is no specific order in which steps 201-205 of the operation method 200 are performed, and some of these steps may be implemented simultaneously.

It can be appreciated that the operation method 200 illustrated in FIG. 2 and the lighting system 100 illustrated in FIG. 1 that perform the operation method 200 have an advantage that before the color temperature of the light emitted by the LEDs 61 is changed by step 205, the fact that the control signal 8 is not identical to the electrical signal 7 from the mains electricity would not cause the light emitted by the LEDs 61 to flash, nor would intensity/luminance of the light emitted by the LEDs 61 degrade, because the waveform modification made to the electrical signal 7 to create the control signal 8 that is utilized to control/change the color temperature of the LEDs 61 is slight (e.g., with a frequency difference of 2-10 Hz) and only lasts a short period of time (equal to or slightly greater than the predetermined period of time of, e.g., 1-5 seconds), after which the control signal 8 would become identical to the electrical signal 7 again. In addition, the operation method 200 switches the color temperature of the LEDs 61 directly to the color temperature the user desires. Therefore, the user does not have to endure multiple color-temperature changes that may bother or annoy the user.

Alterations may be made to the operation method 200. For example, in some embodiments, the modified control signal 8 in the transition mode is composed by substituting at least one periodic wave of the electrical signal 7 with a zero-amplitude wave. As an example, in a case that the frequency of the electrical signal 7 is 60 (periodic) waves per second, in a period of 1 second, the normal control signal 8 would have a pattern of 60 waves (60 periodic waves of the electrical signal 7), and the modified control signal 8 may have a pattern of less-than-60 (e.g., 58, 56 or 54) waves followed by one or more zero-amplitude waves (e.g., the zero amplitude continues for 2/60, 4/60 or 6/60 seconds). In these embodiments, the LED-controlling unit 62 of the lighting device 6 detects in step 203 a change in the pattern of the control signal 8 rather than a change in the waveform of the control signal 8, and starts a timer upon detection of such change.

The following paragraphs provide various examples of the embodiments disclosed herein.

Example 1 is a lighting system. The lighting system includes a controlling device configured to receive an electrical signal from mains electricity, operate in one of a normal mode and a transition mode, enter the transition mode upon receiving a tuning signal, and enter the normal mode after a predetermined period of time has elapsed since a latest receipt of the tuning signal. The lighting system further includes a lighting device connected to the controlling device and including a plurality of light-emitting diodes (LEDs), the lighting device being configured to receive a control signal from the controlling device, and to set a color temperature of light emitted by the LEDs according to waveform of the control signal. The controlling device is configured, in the normal mode, to continuously output the electrical signal as the control signal, and in the transition mode, to generate a modified signal by modifying the electrical signal according to the tuning signal and to continuously output the modified signal as the control signal.

Example 2 may include the subject matter of Example 1, and may further specify that the controlling device is configured, in the transition mode, to generate the modified signal to have a frequency different from that of the electrical signal.

Example 3 may include the subject matter of Example 2, and may further specify that the controlling device is configured, in the transition mode, to make the frequency of the modified signal lower than that of the electrical signal.

Example 4 may include the subject matter of Example 1, and may further specify that the controlling device is configured, in the transition mode, to generate the modified signal by making a frequency of the modified signal the same as that of the electrical signal and making waveform of at least a portion of the modified signal different from that of the electrical signal.

Example 5 may include the subject matter of Example 4, and may further specify that the controlling device is configured, in the transition mode, to generate the modified signal by making the portion of the modified signal have zero amplitude.

Example 6 may include the subject matter of Example 1, and may further specify that the lighting device is configured to detect a change in the waveform of the control signal, and to set, when detecting that the waveform of the control signal has changed into a changed waveform for the predetermined period of time, the color temperature of the light emitted by the LEDs according to the changed waveform of the control signal.

Example 7 may include the subject matter of Example 1, and may further specify that the lighting device further includes an LED-controlling unit electrically connected to the LEDs and the controlling device, the LED-controlling unit being configured to: receive the control signal from the controlling device; detect a change in the waveform of the control signal; upon detecting that the waveform of the control signal is changed to a changed waveform and is maintained at the changed waveform for the predetermined period of time, trigger at least a portion of the LEDs to emit light with a color temperature according to the changed waveform.

Example 8 may include the subject matter of Example 7, and may further specify that the LED-controlling unit includes a memory, the memory storing plural predetermined waveforms that are different from the waveform of the electrical signal and that correspond respectively to different color temperature settings. Example 8 may further specify that the LED-controlling unit is further configured to: determine whether the changed waveform matches any one of the predetermined waveforms stored in the memory; and when and only when it is determined that the changed waveform matches one of the predetermined waveforms stored in the memory, trigger the portion of the LEDs to emit light according to the color temperature setting corresponding to the one of the predetermined waveforms.

Example 9 may include the subject matter of Example 1, and may further include an input device that is configured to wirelessly transmit the tuning signal to the controlling device in response to user operation of the input device.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lighting system comprising:
a controlling device configured to receive an electrical signal from mains electricity, operate in one of a normal mode and a transition mode, enter the transition mode upon receiving a tuning signal, and enter the normal mode after a predetermined period of time has elapsed since a latest receipt of the tuning signal; and
a lighting device connected to said controlling device and including a plurality of light-emitting diodes (LEDs), said lighting device being configured to receive a control signal from said controlling device, and to set a color temperature of light emitted by said LEDs according to waveform of the control signal;
wherein said controlling device is configured, in the normal mode, to continuously output the electrical signal as the control signal, and in the transition mode, to generate a modified signal by modifying the electrical signal according to the tuning signal and to continuously output the modified signal as the control signal.

2. The lighting system of claim 1, wherein said controlling device is configured, in the transition mode, to generate the modified signal to have a frequency different from that of the electrical signal.

3. The lighting system of claim 2, wherein said controlling device is configured, in the transition mode, to make the frequency of the modified signal lower than that of the electrical signal.

4. The lighting system of claim 1, wherein said controlling device is configured, in the transition mode, to generate the modified signal by making a frequency of the modified signal the same as that of the electrical signal and making waveform of at least a portion of the modified signal different from that of the electrical signal.

5. The lighting system of claim 4, wherein said controlling device is configured, in the transition mode, to generate the modified signal by making the portion of the modified signal have zero amplitude.

6. The lighting system of claim 1, wherein said lighting device is configured to detect a change in the waveform of the control signal, and to set, when detecting that the waveform of the control signal has changed into a changed waveform for the predetermined period of time, the color temperature of the light emitted by said LEDs according to the changed waveform of the control signal.

7. The lighting system of claim 1, wherein said lighting device further includes an LED-controlling unit electrically connected to said LEDs and said controlling device, said LED-controlling unit being configured to:
receive the control signal from said controlling device;
detect a change in the waveform of the control signal;
upon detecting that the waveform of the control signal is changed to a changed waveform and is maintained at the changed waveform for the predetermined period of time, trigger at least a portion of said LEDs to emit light with a color temperature according to the changed waveform.

8. The lighting system of claim 7, wherein:
said LED-controlling unit includes a memory, said memory storing plural predetermined waveforms that are different from the waveform of the electrical signal and that correspond respectively to different color temperature settings; and
said LED-controlling unit is further configured to
determine whether the changed waveform matches any one of the predetermined waveforms stored in said memory, and
when and only when it is determined that the changed waveform matches one of the predetermined waveforms stored in said memory, trigger said portion of said LEDs to emit light according to the color temperature setting corresponding to said one of the predetermined waveforms.

9. The lighting system of claim 1, further comprising an input device that is configured to wirelessly transmit the tuning signal to said controlling device in response to user operation of said input device.

* * * * *